United States Patent
Linsalata et al.

(10) Patent No.: US 9,904,720 B2
(45) Date of Patent: Feb. 27, 2018

(54) GENERATING OFFLINE CONTENT

(71) Applicant: Facebook, Inc., Menlo Park, CA (US)

(72) Inventors: David Linsalata, San Francisco, CA (US); Rajat Kansal, Mountain View, CA (US); Alexei Gousev, Menlo Park, CA (US); Andreas Nomikos, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 571 days.

(21) Appl. No.: 14/030,936

(22) Filed: Sep. 18, 2013

(65) Prior Publication Data

US 2015/0081630 A1 Mar. 19, 2015

(51) Int. Cl.
*G06F 17/30* (2006.01)
*G06Q 50/00* (2012.01)

(52) U.S. Cl.
CPC ....... *G06F 17/30578* (2013.01); *G06Q 50/01* (2013.01)

(58) Field of Classification Search
None
See application file for complete search history.

(56) References Cited

U.S. PATENT DOCUMENTS

| 8,065,673 | B2 | 11/2011 | D'Souza | |
|---|---|---|---|---|
| 2001/0003828 | A1 | 6/2001 | Peterson | |
| 2009/0157811 | A1 | 6/2009 | Bailor et al. | |
| 2010/0153521 | A1* | 6/2010 | Lor | G06F 15/16 709/219 |
| 2011/0047182 | A1 | 2/2011 | Shepherd | |
| 2011/0083101 | A1 | 4/2011 | Sharon | |
| 2011/0154223 | A1* | 6/2011 | Whitnah | G06Q 10/10 715/753 |
| 2011/0179062 | A1 | 7/2011 | Lee | |
| 2012/0046770 | A1 | 2/2012 | Becker | |
| 2012/0159635 | A1* | 6/2012 | He | G06F 21/6245 726/26 |

(Continued)

FOREIGN PATENT DOCUMENTS

KR  10-0645018 B1  11/2006

OTHER PUBLICATIONS

Documentation on http://support.google.com entitled "*Edit Google documents offline—Drive Help*," https://support.google.com/drive/answer/107972?hl=en (as downloaded on Sep. 27, 2013); pp. 1-3, Sep. 27, 2013.

(Continued)

*Primary Examiner* — James Trujillo
*Assistant Examiner* — Cheryl M Shechtman
(74) *Attorney, Agent, or Firm* — Baker Botts L.L.P.

(57) ABSTRACT

In one embodiment, a method includes receiving, from a user of a client computing device and when the client computing device is disconnected from an on-line service, input associated with the on-line service. The method further includes locally storing or modifying locally stored content associated with the on-line service based on the input. The client computing device may determine data contemporaneous with the content and locally associate the data with the content. The method further includes automatically uploading the content as locally stored or modified and the data locally associated with the content to the on-line service when the client computing device is connected to the on-line service.

27 Claims, 4 Drawing Sheets

(56) References Cited

U.S. PATENT DOCUMENTS

2013/0060873 A1* 3/2013 Gautam .............. G06Q 10/107
709/206

OTHER PUBLICATIONS

Documentation on http://www.stone.com entitled "Twittelator Pro Help : index," http://www.stone.com/Twittelator/help/index.html#MESSAGEQUEUE (as downloaded on Sep. 27, 2013); pp. 1-55, Sep. 27, 2013.
International Search Report and Written Opinion for International Application PCT/US2014/055735, dated Dec. 23, 2014.
Extended European Search Report for EP Application No. 14845262.6-1871, dated Feb. 24, 2017.

* cited by examiner

GENERATING OFFLINE CONTENT

TECHNICAL FIELD

This disclosure generally relates to updating electronic content.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

SUMMARY OF PARTICULAR EMBODIMENTS

A user of a client computing device may experience lack of connectivity to a network or to a system accessible by that network, such as for example to a social-networking service. An on-line system or service may have an associated "offline" mode allowing a user of a client computing device to interact with a local copy of at least part of the on-line system or service, even when the device is not connected to the on-line service. The presentation of the of the offline and online versions may be completely or largely identical and the transition between online and offline modes may be seamless, resulting in an enhanced user experience by allowing the user to interact with that service in a consistent manner, regardless of connectivity.

An example method for updating an offline copy of an on-line service with content and associated data, and subsequently uploading that electronic content and associated data to the on-line service, may include receiving input associated with an online service at a time a client computing device is not connected to the online service. A copy of the online service locally stored on the client computing device may be added to or altered based on the input. Data contemporaneous with the altered content (such as, for example, a time the input occurred, the location of the client computing device at or near the time of the input, and/or a context associated with the content) may be associated with the content and stored on the client computing device. When the client computing device connects (e.g., by user instruction) to the online service, the altered content of the offline, locally stored copy is uploaded and synchronized to the online service. The uploaded content or notifications about the uploaded content may be displayed to other users of the online service, and the user generating the content may be notified of the success or failure of a particular upload.

The embodiments disclosed above are only examples, and the scope of this disclosure is not limited to them. Particular embodiments may include all, some, or none of the components, elements, features, functions, operations, or steps of the embodiments disclosed above.

DESCRIPTION OF EXAMPLE EMBODIMENTS

Figure 1:
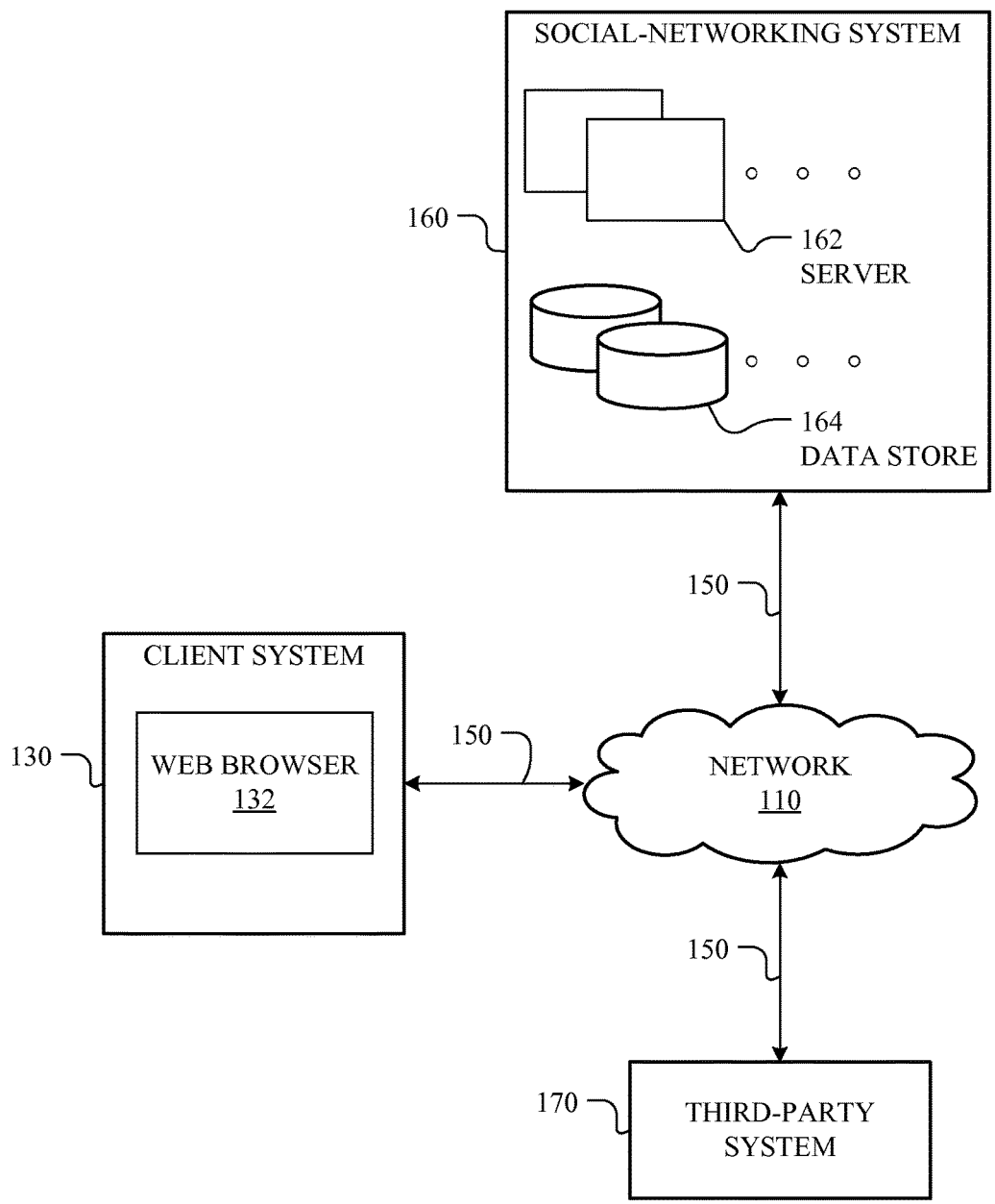
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 164 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (e.g., relationships) to a number of other users of social-networking system 160 whom they want to be connected to. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in to or opt out of having their actions logged by social-networking system 160 or shared with other systems (e.g., third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Figure 2:
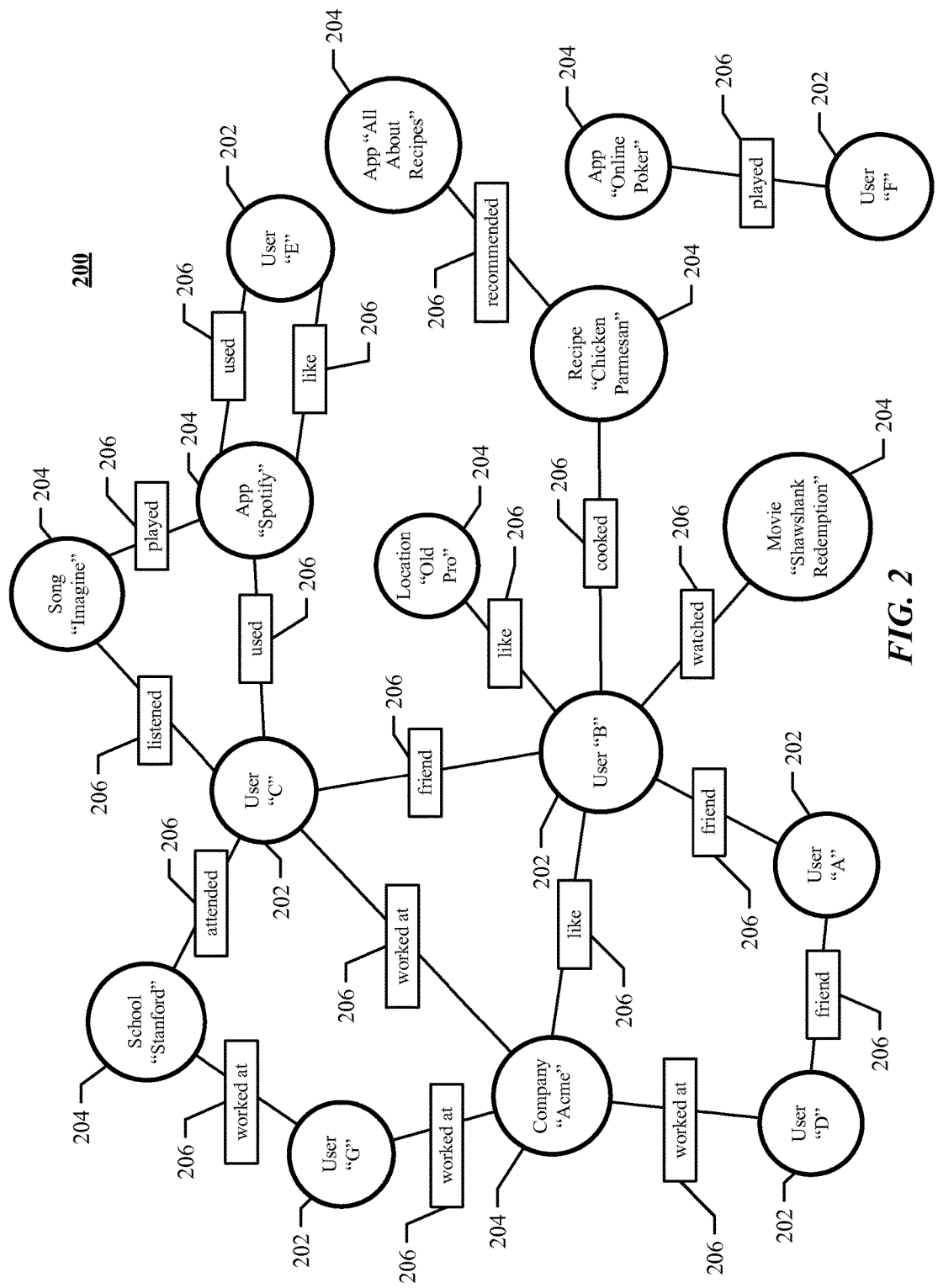
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 130 to send to social-networking system 160 a message indicating the user's action. In response to the message, social-networking system 160 may create an edge (e.g., an "eat" edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 164. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 204 corresponding to a particular photo may have a privacy setting specifying that the photo may only be accessed by users tagged in the photo and their friends. In particular embodiments, privacy settings may allow users to opt in or opt out of having their actions logged by social-networking system 160 or shared with other systems (e.g., third-party system 170). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 162 may be authorization/privacy servers for enforcing privacy settings. In response to a request from a user (or other entity) for a particular object stored in a data store 164, social-networking system 160 may send a request to the data store 164 for the object. The request may identify the user associated with the request and may only be sent to the user (or a client system 130 of the user) if the authorization server determines that the user is authorized to access the object based on the privacy settings associated with the object. If the requesting user is not authorized to access the object, the authorization server may prevent the requested object from being retrieved from the data store 164, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

A user of a client computing device may experience lack of connectivity to a network or to a system accessible by that network, such as for example to any of the networks 110 or to any of third party systems 170 or social-networking systems 160 described above. In particular embodiments a client computing device may be a mobile computing device. In particular embodiments, lack of connectivity may on a per-network basis. For example, a client computing device may lack connectivity to a Wi-Fi network while having connectivity to a cellular-based or GPS network.

An on-line system or service associated with that system may have an associated "offline" mode allowing a user of a client computing device to interact with a local copy of at least part of the on-line system or service. For example, a client computing device may periodically or upon user or server request store a local copy of at least part of a social-networking service, such as for example a user's profile (and suitable associated information, such as content, posts, or newsfeed items), connections between that user and other users or entities, posts made by a user, content viewed by, generated, or interacted with by the user, or any other suitable portion of the social-networking service. In particular embodiments, an offline mode may be toggled by a user, an event, or both. For example, a user on an airplane may activate an offline mode and thus interact with a local copy of an associated on-line service. As another example, a user seeking to conserve, for example, cellular data may identify particular interactions with a service that should occur in an offline mode (i.e., interactions that are made to a locally stored, rather than network-stored, copy) until a Wi-Fi connection is established. As another example, a user may identify an amount or percentage of data used over one or more types of network connections above which interactions should occur in an offline mode. This disclosure contemplates using any suitable events, including any suitable user instructions, to determine whether one or more interactions with a service should occur in an offline mode.

Figure 3:
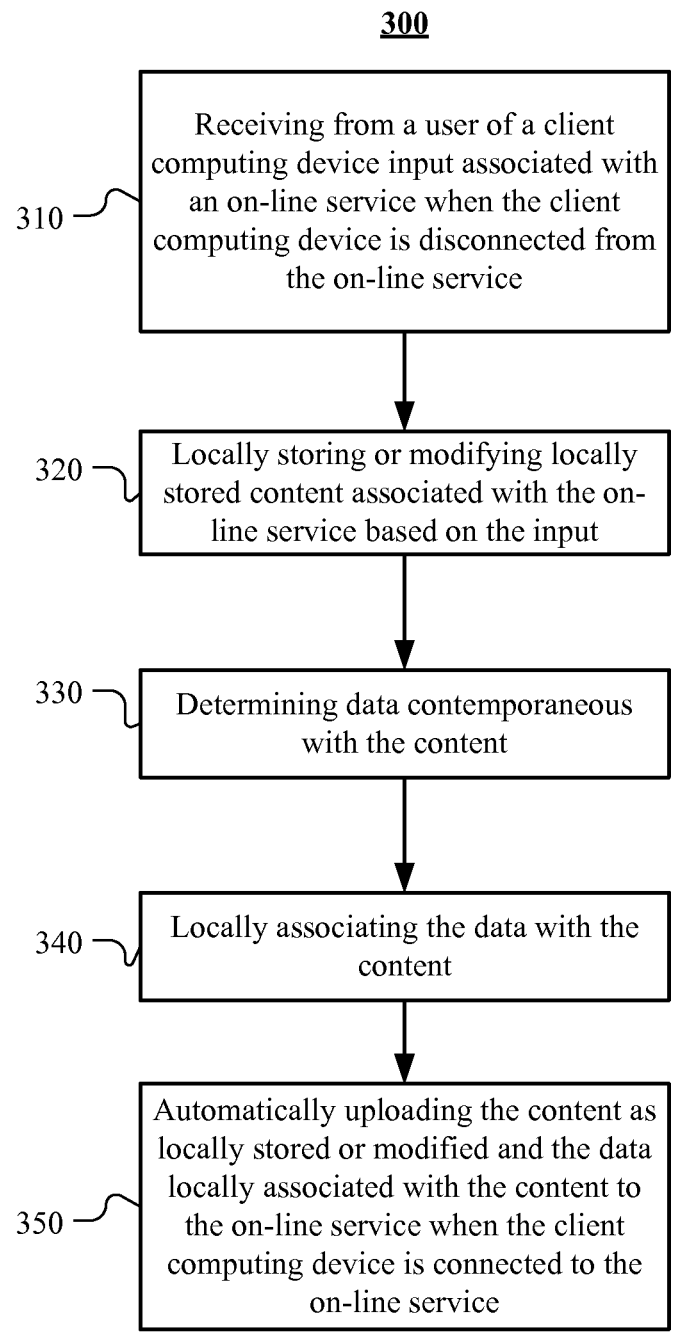
FIG. 3 illustrates an example method for updating an offline copy of an on-line service with content and associated data, and subsequently uploading that electronic content and associated data to the on-line service.

FIG. 3 illustrates an example method 300 for updating an offline copy of an on-line service with content and associated data, and subsequently uploading that electronic content and associated data to an on-line service. The method may begin at step 310, where input from a user of a client-computing device associated with an on-line service is received at a time the client computing device is disconnected from the on-line service. The input may be any suitable input, such as for example typed or written characters, interaction with one or more components of a graphical user interface (such as, for example, graphical buttons, banners, images, advertisements, etc. associated with an on-line service), voice-activated input, gesture input, or any suitable combination thereof. As described above, the client computing device may be considered to be disconnected from an on-line service when the client computing device is not accessing the on-line service over one or more specific network connections (including when those connections have been disabled by a user of the client computing device), even when the client computing device may be utilizing those network connections for other purposes.

The method includes storing or modifying locally stored content associated with the on-line service based on the input, as illustrated by step 320. As an example, the on-line service may be a social-networking service associated with a social-networking system. The input may be any suitable interaction with the social-networking service, such as for example posting content to a user profile, tagging connections in a post or photo, requesting new connections or altering existing connections, indicating user preferences (such as, e.g., "liking" an entity or content), creating communications with other entities, or any other suitable functionality of a social-networking service (including any of the suitable functionalities described more fully herein). In this example, content is stored to a locally stored copy of the profile by, for example, including the posted content in locally stored profile. As another example, input may be editing, adding to, or deleting existing content, such as for example adding one or more photos to a photo album or removing previous connections between the user and another entity from a graph associated with the social-networking service. In this example, content is modified on the locally stored copy (or portion of the copy) of the social-networking service by, for example, modifying the locally stored photo album or graph. This disclosure contemplates any suitable input modifying any suitable content of a client computing device associated with any suitable on-line service.

At step 330, data contemporaneous with the locally stored or modified content of step 320 is determined. Data contemporaneous with the locally stored or modified content includes data associated with the time or place the content was locally stored or modified. For example, data may include a time offline content was generated. As another example, in the context of a social-networking service, data may include a time content was submitted for offline posting. As another example, data may include a description or identification of the locally stored or modified content. For example, in the context of a social-networking service, data may include an identification of events or people associated with the content, such as for example an identification of an individual appearing in a photo. Alternatively, those identifications may be input by a user and thus may be content as described in step 320.

In particular embodiments, data may include one or more privacy settings governing, for example, the online visibility of offline-generated content or identifying users/entities that may interact with that content. For example, a privacy setting that was last used to post online-generated content may be locally cached by the client computing device and applied to offline-generated content. When the offline-generated content is uploaded to an online service, the locally cached privacy settings are applied to that uploaded content. In particular embodiments, a user may change a locally cached privacy setting or create a locally cached privacy setting, and that privacy setting may be applied to content uploaded to an on-line service. In particular embodiments, a privacy setting may be applied on a per-input basis (i.e., may be applied to a particular interaction between the user and the offline service, with a different privacy setting applied to a subsequent interaction). In particular embodiments, a privacy setting may be applied to all offline content generated until that privacy setting is changed. In particular embodiments, a default privacy setting may be applied until changed by a user.

In particular embodiments, data may include location information. For example, location information may include location information manually input by a user of the client computing device, such as estimated or specific geographic coordinates or the name of a business, structure, landmark, intersection, previously saved location, general area etc. The physical location associated with that input may be determined after the client computing device accesses an online service. As another example, location information may include location determined by one or more GPS signals, or location information obtained from communications with one or more networks. For example, a mobile phone may determine its location information via communication with a cellular network, while a social-networking service requires (e.g., by user settings) a Wi-Fi connection in order to update the on-line version of the social-networking service. Thus, when the mobile phone is connected to a Wi-Fi signal, the location information previously determined by the phone via the cellular network may be uploaded to the social-networking service along with appropriate offline-generated content. This disclosure contemplates any suitable data contemporaneous with the locally stored or modified content being associated with that content.

At step 340, the data of step 330 is locally stored with its associated content. For example, a time that content is created is associated on the client computing device with that content. At step 350, when the client computing device is connected to the online service the content as locally stored or modified and the data locally associated with the content is uploaded to the on-line service. As described above, in particular embodiments "connected to the online service" may include being connected to the online service via one or more specific networks, such as any of the networks 110 described above. The uploading of content may be based on any suitable event, such as input by a user initiating the upload or the establishment of a network connection capable of uploading the content at or above a specific bandwidth.

Particular embodiments may repeat one or more steps of the method of FIG. 3, where appropriate. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates an example method for uploading electronic content and associated data to an on-line service including the particular steps of the method of FIG. 3, this disclosure contemplates any suitable method uploading electronic content and associated data to an on-line service including any suitable steps, which may include all, some, or none of the steps of the method of FIG. 3, where appropriate. Furthermore, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

After content generated in an offline mode is uploaded and synchronized to online content, that uploaded content may be displayed to one or more users of the online service. In particular embodiments, the display may be based on the data associated with the content in step 330. For example, an offline-generated photo may be placed in an appropriate online photo album based on data identifying the photo's content, location, acquisition time, etc. For example, data indicating when the photo was uploaded to the offline copy of the online service may be used to insert the photo in an appropriate position in the photo album by comparing that data with analogous data describing when other photos in the photo album were uploaded. The photos may be stored and displayed in the photo album in sequential order according to their upload times. As another example, a post to a social-networking service may display the time the "offline" post was made, and may insert the post in its proper position relative to other posts based on that time. In particular embodiments, other users of an online service may be notified that offline-generated content has been uploaded. For example, if the online service is a social-networking service, users of the social-networking service may be notified of the uploaded content by, for example, a newsfeed item describing the upload event and/or the uploaded content. As described above, privacy settings associated with a user's content being uploaded may determine which users, if any, are allowed to view the uploaded content and/or a notification of the upload event. This disclosure contemplates any suitable display of and notification about uploaded content to any suitable on-line service.

Any suitable graphical user interface may be associated with an offline mode for a social-networking service. In particular embodiments, the interface may visually indicate when the service is in an offline vs. online mode. For example, a social-networking service may indicate when a user is posting in an offline mode. In particular embodiments, an interface may describe or indicate which features or functionality are available to a user in an offline mode. For example, an interface for a social-networking service may indicate whether posting, tagging, photo uploading, etc. are available to the user in an offline mode of the social-networking service. In particular embodiments, an interface may display a queue of content to be uploaded to an online service, and all or some of the content in that queue may be altered prior to uploading. For example, offline posts made in a social-networking service may be queued prior to uploading, and a user may edit, delete, add to, or otherwise modify those posts prior to uploading. In particular embodiments, an interface may notify a user when content is successfully or unsuccessfully uploaded.

Figure 4:
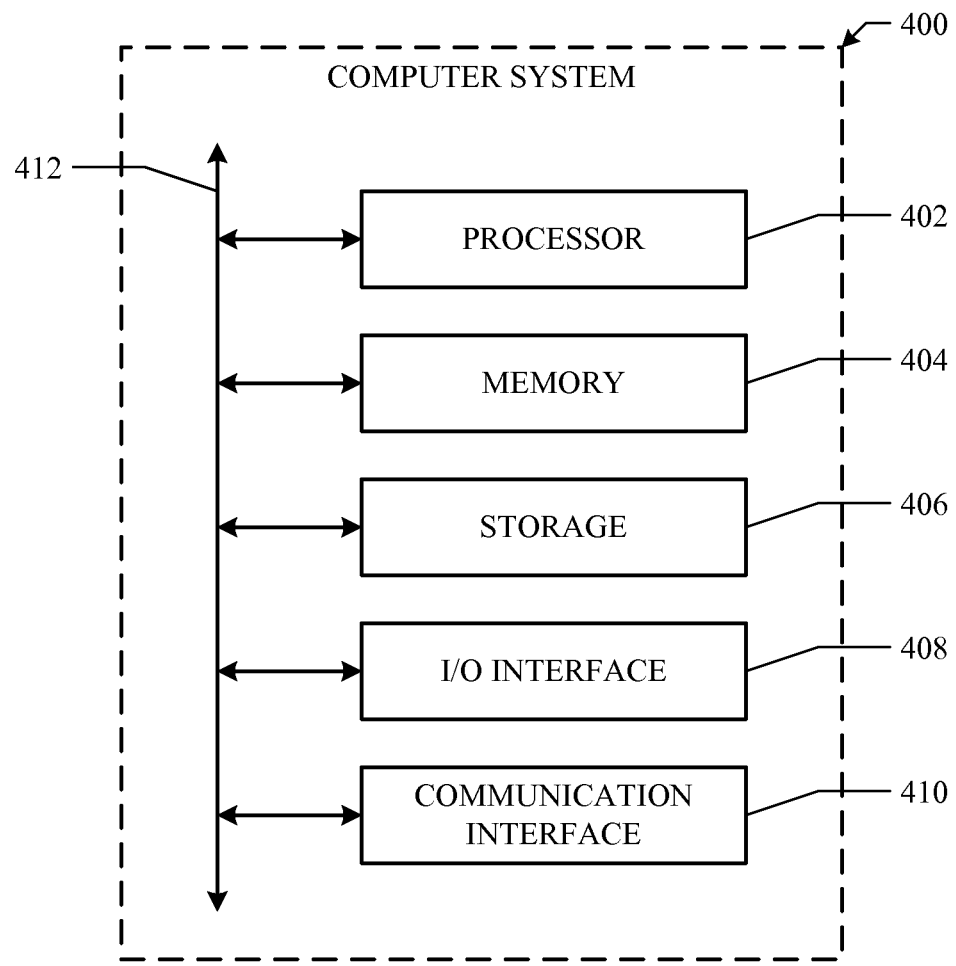
FIG. 4 illustrates an example computer system.

FIG. 4 illustrates an example computer system 400. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such as, for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
   by a client computing device associated with a user, receiving input in relation to a content item of an on-line service, wherein the client computing device is disconnected from the on-line service when the input is received;
   by the client computing device, based on the input, locally storing the content item or modifying the locally stored content item in an offline version of the on-line service;
   by the client computing device, determining a time when the content item was posted to the offline version of the on-line service; and
   by the client computing device, when the client computing device is connected to the online service, automatically uploading the content item to the on-line service, wherein the uploaded content item is inserted into a position determined relative to a plurality of other content items stored by the on-line service based on a comparison between the time when the content item was posted to the offline version of the on-line service times associated with the other content items.

2. The method of claim 1, wherein modifying locally stored content comprises one or more of:
   editing the content;
   deleting the content; or
   adding to the content.

3. The method of claim 1, wherein the online service comprises a social-networking system, the social-networking system comprising a graph that comprises a plurality of nodes and edges connecting the nodes, at least one node in the graph corresponding to the user.

4. The method of claim 3, wherein at least one other node in the graph corresponds to each of one or more other users, at least one of the nodes corresponding to the user and at least one of the nodes corresponding to one of the other users being connected to each other by one or more of the edges.

5. The method of claim 4, wherein the automatically uploaded content is associated with a notification displayed to one or more of the other users of the social network.

6. The method of claim 1, further comprising associating with the uploaded content a privacy setting identifying one or more other users of the online service that may view or interact with the uploaded content.

7. The method of claim 1, wherein the uploaded content comprises one or more images and the other content items comprise one or more previously-uploaded images.

8. The method of claim 1, further comprising:
  determining a location of the client computing device at the time the content item was posted to the offline version of the on-line service; and
  associating the location with the uploaded content item.

9. The method of claim 1, further comprising determining, by the client computing device, whether to connect the client device to the online service based on a setting determined at least in part by the user.

10. The method of claim 9, wherein the setting is based on one or more of:
  a connection between the client computing device and the on-line service;
  an amount of data to be uploaded to the on-line service; or
  a type of the content uploaded.

11. The method of claim 1, wherein the uploaded content item and at least one of the plurality of other content items are presented in an order corresponding to their relative positions.

12. One or more computer-readable non-transitory storage media embodying software that is operable when executed to:
  receive from a user of the client computing device input in relation to a content item of an on-line service, wherein the client computing device is disconnected from the on-line service when the input is received;
  based on the input, locally store the content item or modify the locally stored content item in an offline version of the on-line service;
  determine a time when the content item was posted to the offline version of the on-line service; and
  when the client computing device is connected to the on-line service, automatically upload the content item to the on-line service, wherein the uploaded content item is inserted into a position determined relative to a plurality of other content items stored by the on-line service based on a comparison between the time when the content item was posted to the offline version of the on-line service and times associated with the other content items.

13. The media of claim 12, wherein the online service comprises a social-networking system, the social-networking system comprising a graph that comprises a plurality of nodes and edges connecting the nodes, at least one node in the graph corresponding to the user.

14. The media of claim 13, wherein at least one other node in the graph corresponds to each of one or more other users, at least one of the nodes corresponding to the user and at least one of the nodes corresponding to one of the other users being connected to each other by one or more of the edges.

15. The media of claim 14, wherein the automatically uploaded content is associated with a notification displayed to one or more of the other users of the social network.

16. The media of claim 12, wherein the software is further operable when executed to associate with the uploaded content a privacy setting identifying one or more other users of the online service that may view or interact with the uploaded content.

17. The media of claim 12, wherein the software is further operable when executed to:
  determine a location of the client computing device at the time the content item was posted to the offline version of the on-line service; and
  associate the location with the uploaded content item.

18. A system comprising: one or more processors; and
a memory coupled to the processors comprising instructions executable by the processors, the processors being operable when executing the instructions to:
  receive from a user of a client computing device input in relation to a content item of an on-line service, wherein the client computing device is disconnected from the on-line service when the input is received;
  based on the input, locally store the content item or modify the locally stored content item in an offline version of the on-line service;
  determine a time when the content item was posted to the offline version of the on-line service; and
  when the client computing device is connected to the on-line service, automatically upload the content item to the on-line service, wherein the uploaded content item is inserted into a position determined relative to a plurality of other content items stored by the on-line service based on a comparison between the time when the content item was posted to the offline version of the on-line service and times associated with the other content items.

19. A method comprising:
  by a server computing device associated with an on-line service, receiving, from a client device, data corresponding to a user input made in relation to a content item of the on-line service, wherein the input was provided to the client computing device during a time that the client computing device was disconnected from the on-line service;
  by the server computing device, storing the content item or modifying, based on the data, a stored instance of the content item;
  by the server computing device, determining a time when the content item was posted to an offline version of the on-line service stored on the client computing device; and
  by the server computing device, associating with the stored content item a position determined relative to a plurality of other content items stored by the on-line service, the position based on a comparison between the time when the content item was posted to the offline version of the on-line service and times associated with the other content items.

20. The method of claim 19, wherein modifying a stored instance of the content item comprises one or more of:
  editing the content;
  deleting the content; or
  adding to the content.

21. The method of claim 19, wherein the online service comprises a social-networking system, the social-networking system comprising a graph that comprises a plurality of nodes and edges connecting the nodes, at least one node in the graph corresponding to the user.

22. The method of claim 21, wherein at least one other node in the graph corresponds to each of one or more other users, at least one of the nodes corresponding to the user and at least one of the nodes corresponding to one of the other users being connected to each other by one or more of the edges.

23. The method of claim 22, wherein the stored or modified content is associated with a notification displayed to one or more of the other users of the social network.

24. The method of claim 19, wherein the data comprises a privacy setting identifying one or more other users of the online service that may view or interact with the uploaded content.

25. The method of claim 19, wherein the stored or modified content comprises one or more images and the other content items comprise one or more previously-uploaded images.

26. The method of claim 19, further comprising: by the server computing device, receiving information identifying a location of the client computing device at the time the content item was posted to the offline version of the on-line service; and associating the location with the stored or modified content item.

27. The method of claim 19, wherein the stored content item and at least one of the plurality of other content items are presented in an order corresponding to their relative positions.

* * * * *